US008265585B2

(12) United States Patent
Inako et al.

(10) Patent No.: US 8,265,585 B2
(45) Date of Patent: Sep. 11, 2012

(54) IBOC BROADCASTING RECEIVER

(75) Inventors: Kazuyoshi Inako, Saitama (JP); Kazuo Koyama, Hasuda (JP); Masanori Ishida, Ageo (JP); Naoki Nakajima, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 0 days.

(21) Appl. No.: 12/310,583

(22) PCT Filed: Aug. 30, 2007

(86) PCT No.: PCT/JP2007/066900

§ 371 (c)(1),
(2), (4) Date: Apr. 19, 2010

(87) PCT Pub. No.: WO2008/026693

PCT Pub. Date: Mar. 6, 2008

(65) Prior Publication Data

US 2010/0210229 A1 Aug. 19, 2010

(30) Foreign Application Priority Data

Aug. 31, 2006 (JP) ................................ 2006-234961

(51) Int. Cl.
*H04B 1/10* (2006.01)

(52) U.S. Cl. ...................... 455/307; 455/296; 455/226.1

(58) Field of Classification Search .................. 455/307, 455/296, 226.1–226.4, 67.11, 552.1–553.1, 455/437

See application file for complete search history.

(56) References Cited

U.S. PATENT DOCUMENTS 5,095,534 A 3/1992 Hiyama
5,423,064 A * 6/1995 Sakata ...................... 455/67.11
5,499,394 A * 3/1996 Kaatz et al. .................. 455/307
5,519,887 A * 5/1996 Lieu ............................ 455/306
5,668,837 A * 9/1997 Dent ............................ 455/307
6,393,284 B1 * 5/2002 Dent ............................ 455/307
6,784,728 B2 * 8/2004 Fischer ...................... 455/226.1
7,443,837 B2 * 10/2008 Aoyagi et al. ................ 455/307
2004/0162048 A1 * 8/2004 Milbar et al. ................ 455/266
2005/0003772 A1 1/2005 Nemoto
2005/0143047 A1 6/2005 Kwon et al.
2005/0272385 A1 12/2005 Nagano et al.
2007/0004335 A1 * 1/2007 DeMoor et al. ........... 455/553.1

FOREIGN PATENT DOCUMENTS

EP 1335490 8/2002
EP 1280275 1/2003
EP 1280275 A1 1/2003
EP 1335490 A2 8/2003

(Continued)

*Primary Examiner* — Lana N Le

(74) *Attorney, Agent, or Firm* — McCarter & English, LLP

(57) ABSTRACT

An broadcasting receiver suitable for receiving a broadcasting signal transmitted in an IBOC signal format, includes: a narrowband filtering means suitable for processing an analog broadcasting signal included in the broadcasting signal; a wideband filtering means suitable for processing a digital broadcasting signal included in the broadcasting signal; a demodulating means for demodulating the broadcasting signal; a signal level detecting means for detecting a level of the broadcasting signal; a digital determining means for determining whether the broadcasting signal includes digital broadcasting signal or not; and a filter switching means for switching filtering means for use in processing the broadcasting signal to be input to the demodulating means between the narrowband filtering means and the wideband filtering means, according to the level of the detected broadcasting signal, when the digital determining means determines that the broadcasting signal does not include the digital broadcasting signal.

11 Claims, 2 Drawing Sheets

FOREIGN PATENT DOCUMENTS

Figure 1:
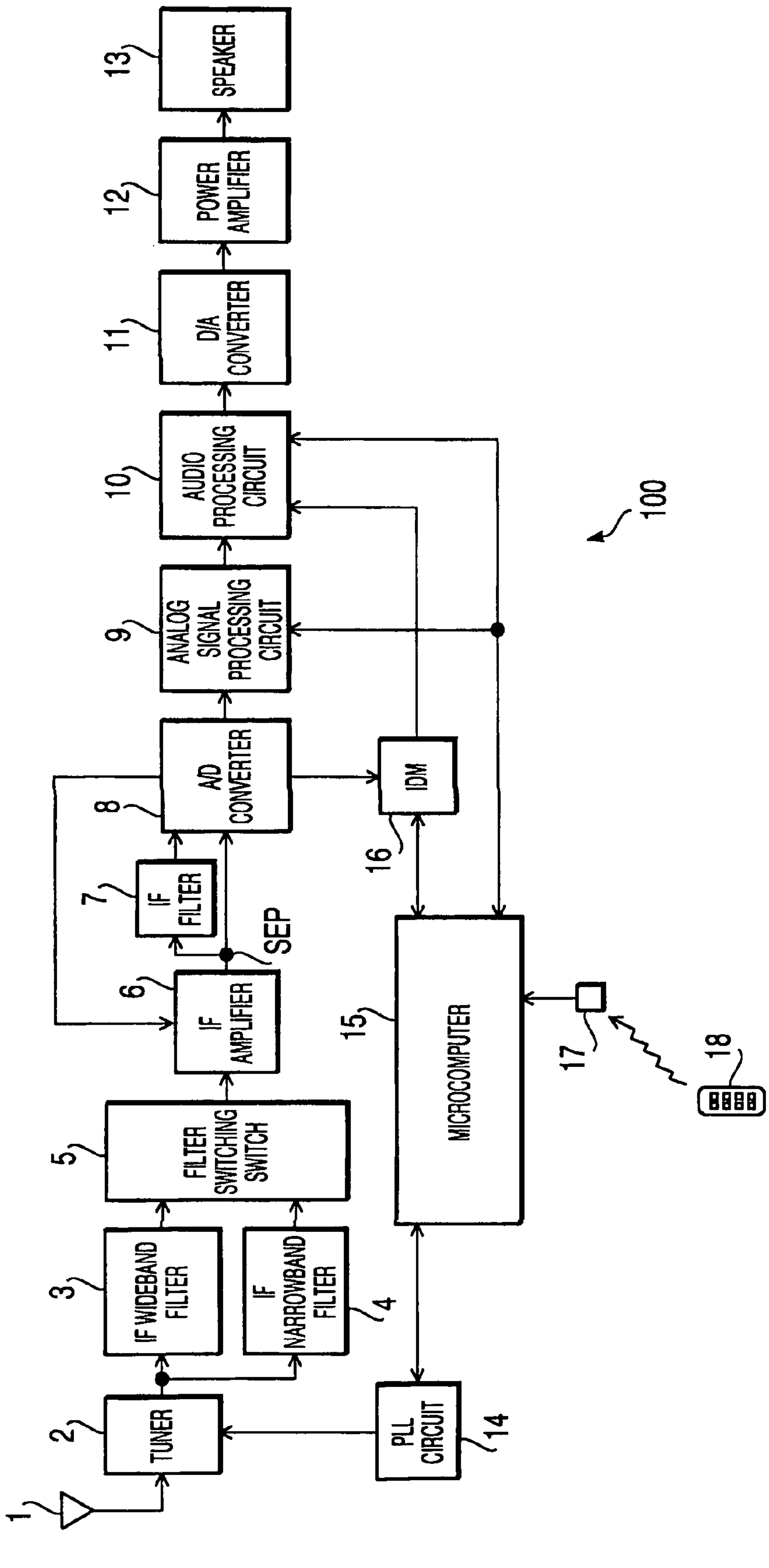

| | | | |
|---|---|---|---|
| GB | 2222332 | | 8/1989 |
| GB | 2222332 | A | 2/1990 |
| JP | 2-186723 | | 7/1990 |
| JP | 2-186723 | A | 7/1990 |
| JP | 2003-32562 | | 1/2003 |
| JP | 2003-32562 | A | 1/2003 |
| JP | 2003-234977 | | 8/2003 |
| JP | 2003-234977 | A | 8/2003 |
| JP | 2004-349805 | A | 12/2004 |
| JP | 2004349805 | | 12/2004 |

* cited by examiner

IBOC BROADCASTING RECEIVER

FIELD OF THE INVENTION

The present invention relates to a broadcasting receiver, in particular, to an IBOC (In Band On Channel) broadcasting receiver for receiving IBOC type radio broadcasting.

BACKGROUND OF THE ART

Recently, it has become popular to process and manage the sound and video in digital format in appliances such as acoustic appliances and video appliances. Such trends in digital encoding of sound and video in appliances such as acoustic appliances are extending to the field of radio broadcasting. For example, in the United States, a digital radio broadcasting system called IBOC (In Band On Channel) is proposed and made available by iBiquity Digital Corp.

Meanwhile, popular conventional analog radio broadcasting broadcasts via carrier wave (Hereinafter, "analog carrier wave".) that has frequency distribution inside the frequency band corresponding to physical channel (Hereinafter, "channel" or "frequency channel".) assigned to individual broadcasting stations. Actually, in order to avoid the interference between analog carrier wave of adjacent channels, only the center portion of the assigned band is used for the transmission of the analog carrier wave, and other portions are not used. It is noted that "digital radio broadcasting" in this application means "IBOC digital radio broadcasting".

IBOC is a type of digital radio broadcasting that uses frequency channel assigned to the conventional analog radio broadcasting. In IBOC standard, a plurality of signal formats are defined, such as hybrid format in which the digital radio broadcasting signal is multiplexed onto the conventional analog radio broadcasting signal, and all-digital format consisted of only digital signals, and it is designed to gradually transfer from conventional analog radio broadcasting to all-digital radio broadcasting that has many functions and is high in quality. In the IBOC, digital broadcasting signals are transmitted with Orthogonal Frequency Division Multiplexing (OFDM) that uses many carrier waves (subcarriers).

In contrast, in the IBOC standard, signal format called "hybrid format" is used in the transition period from analog broadcasting to all-digital broadcasting. In the hybrid format, the digital radio broadcasting, which allocates the subcarriers of digital broadcasting in the portion that is adjacent to the center portion of the band that the analog carrier wave uses and that was not conventionally used (Hereinafter, "sideband".) is broadcast using the modulated wave of the sideband of the band. In other words, in accordance with the hybrid format of the IBOC, the frequency band for the conventional analog radio broadcasting is utilized effectively, and the analog radio broadcasting and the digital radio broadcasting are simultaneously transmitted using a same channel.

For example, Japanese Patent Provisional Publication No. JP2004-349805 (hereinafter, "the Reference Document".) discloses an IBOC broadcasting receiver that is capable of receiving such IBOC digital radio broadcasting. First, the IBOC broadcasting receiver disclosed in the Reference Document filters the received signal to pass wide frequency band that includes a center portion in which the analog carrier wave of the selected frequency channel is located and the portion (sideband) in which the adjacent subcarriers are located, and the subcarrier as well as the analog carrier wave is decoded. Then, if IBOC signal (identification information showing that it is digital radio broadcasting) is acquired as a result of the decoding, since the digital radio broadcasting is transmitted in the selected frequency channel, the setting of the filtering is maintained to pass a wide range of band.

On the other hand, if IBOC signal was not acquired, then only analog radio broadcasting is transmitted in the selected channel, and no valid information is included in the sideband. In addition, not only the sideband does not include valid information, it easily suffers from disturbances due to the adjacent band (It is the noise, etc. Hereinafter, it is called "adjacent disturbance".), and it becomes the cause of the lowering of the carrier-to-noise ratio (CN ratio) of the selected frequency channel. Therefore, in case the IBOC signal is not acquired, then the signal of the selected channel is filtered to pass the bandwidth of the analog carrier wave. Thereby, the sideband that is unneeded and easily affected by the adjacent disturbance is cut off, and the CN ratio for the analog radio broadcasting is improved.

That is, the IBOC broadcasting receiver disclosed in the above Reference Document is arranged to improve the CN ratio of the analog radio broadcasting so that the band to pass the filter is enabled to be switched according to the existence of the IBOC signal, and the sideband is cut off to improve the CN ratio only if it is determined that the selected channel includes only analog radio broadcasting.

DISCLOSURE OF THE INVENTION

In the IBOC broadcasting receiver in the above Reference Document, two patterns of cases can be imagined, which determine that the IBOC signal is not included in the selecting channel. The first is that a selected channel itself does not include IBOC signal. The second is that the IBOC signal can not be detected due to bad receiving condition of the selected channel. In the former case, since the sideband is unneeded regardless of the receiving condition, cutting off the sideband is appropriate in view of improving the CN ratio. However, in the latter case, cutting off the sideband is not always appropriate. That is, in the latter case, since the sideband is kept in a cut off state even if the receiving condition of the selecting channel is improved, there is a problem in that the digital radio broadcasting cannot be demodulated even if the selected channel is broadcasting the digital radio broadcasting.

Thus, in view of the above, it is an object of the present invention to provide an IBOC broadcasting receiver, which is capable of demodulating the digital radio broadcasting while resolving the above problems, and also decreasing the influence of adjacent disturbance to the analog radio broadcasting.

In accordance with an embodiment of the invention, an broadcasting receiver suitable for receiving a broadcasting signal transmitted in an IBOC signal format is provided, which comprises: a narrowband filtering means suitable for processing an analog broadcasting signal included in the broadcasting signal; a wideband filtering means suitable for processing a digital broadcasting signal included in the broadcasting signal; a demodulating means for demodulating the broadcasting signal; a signal level detecting means for detecting a level of the broadcasting signal; a digital determining means for determining whether the broadcasting signal includes the digital broadcasting signal or not; and a filter switching means for switching filtering means for use in processing the broadcasting signal to be input to the demodulating means between the narrowband filtering means and the wideband filtering means, according to the level of the detected broadcasting signal, when the digital determining means determines that the broadcasting signal does not include the digital broadcasting signal. In this case, the filter switching means may operate such that the broadcasting signal processed by the wideband filtering means is input to the demodulating means when the level of the detected broadcasting signal is higher than a certain value, and may operate such that the broadcasting signal processed by the narrowband filtering means is input to the demodulating means when the level of the detected broadcasting signal is lower than or equal to the certain value.

In the broadcasting receiver so arranged, suitable filtering of the broadcasting signal can be performed according to the receiving condition when it is capable of receiving only the analog broadcasting. Specifically, when the receiving level is high and the receiving condition of the analog broadcasting is good, by performing wideband filtering preparing for receiving the digital signal, the user is enabled to listen to digital broadcasting immediately after detecting the digital broadcasting signal. In addition, when the receiving level of the analog broadcasting is low, by performing narrowband filtering, sound quality of the analog broadcasting can be improved.

Optionally, the filter switching means may include a switching switch. Preferably, the switching switch receives as input the broadcasting signal processed by the narrowband filtering means and the broadcasting signal processed by the wideband filtering means, and outputs only one of the input broadcasting signals.

By adopting such arrangement that switch the output from each of the filter means with a switch, it is enabled to switch the filtering with simple mechanism and quickly.

Further, the broadcasting receiver according the embodiment of the present invention may comprise an amplifying means for amplifying the broadcasting signal. Preferably, the broadcasting signal processed by the filtering means is input to the demodulating means via the amplifying means.

By adopting such arrangement that amplifies the signal after cutting off the out-of-band noise with such a filtering, it is enabled to decrease the signal distortion during amplification where the out-of-band noise involves.

Optionally, the certain value is set to a minimum value of an acceptable level of the broadcasting signal against the influence of adjacent disturbance is allowable.

Optionally, the broadcasting receiver according to the embodiment of the present invention comprises: a selecting means for selecting a channel; and an IBOC determining means for determining whether the broadcasting signal is in the IBOC signal format or not by monitoring the broadcasting signal output to the demodulating means. Preferably, immediately after a channel is selected by the selecting means, the filter switching means operates such that the broadcasting signal processed by the wideband filtering means is input to the demodulating means.

Optionally, the broadcasting receiver according to the embodiment of the present invention may be capable of being mounted on a mobile unit.

In accordance with the embodiment of the present invention, an method for receiving a broadcasting signal transmitted in an IBOC signal format is provided, which comprises: a filtering step for filtering broadcasting signal using one of a narrowband filtering means suitable for processing an analog broadcasting signal included in the broadcasting signal and a wideband filtering means suitable for processing a digital broadcasting signal included in the broadcasting signal; a demodulating step for demodulating the broadcasting signal; a signal level detecting step for detecting a level of the broadcasting signal; a digital determining step for determining whether the broadcasting signal includes digital broadcasting signal or not; and a filter switching step for switching filtering means for use in the filtering step between the narrowband filtering means and the wideband filtering means, according to the level of the detected broadcasting signal, when it is determined that the broadcasting signal does not include the digital broadcasting signal.

Preferably, in the filter switching step, the filtering means for use in the filtering step is switched to the wideband filtering means when the level of the detected broadcasting signal is higher than a certain level, and to the narrowband filtering means when the level of the detected broadcasting signal is lower than or equal to the certain level.

Preferably, in the filter switching step, the filtering means for use in the filtering step is switched by selecting one of the broadcasting signal processed by the narrowband filtering means and the broadcasting signal processed by the wideband filtering means.

Further, the method for receiving according to the embodiment of the present invention may comprise an amplifying step for amplifying the broadcasting signal. In this case, the filtering step, the amplifying step and the demodulating step are preferably performed in this order.

Preferably, the certain value is set to a minimum level of an acceptable level of the broadcasting signal against the influence of adjacent disturbance is allowable.

Further, the method for receiving according to the embodiment of the present invention may comprise a selecting step for selecting a channel; and an IBOC determining step for determining whether the broadcasting signal is in the IBOC signal format or not by monitoring the broadcasting signal demodulated in the demodulating step. In this case, immediately after a channel is selected by the selecting step, in the filter switching step, the filtering means for use in the filtering step is preferably switched to the wideband filtering means.

Furthermore, the IBOC broadcasting receiver may be mounted on a mobile unit.

BRIEF DESCRIPTION OF ACCOMPANYING DRAWINGS

[FIG. 1] A block diagram showing an arrangement of an audio apparatus comprising an IBOC broadcasting receiver according to an embodiment of the invention.

Figure 2:
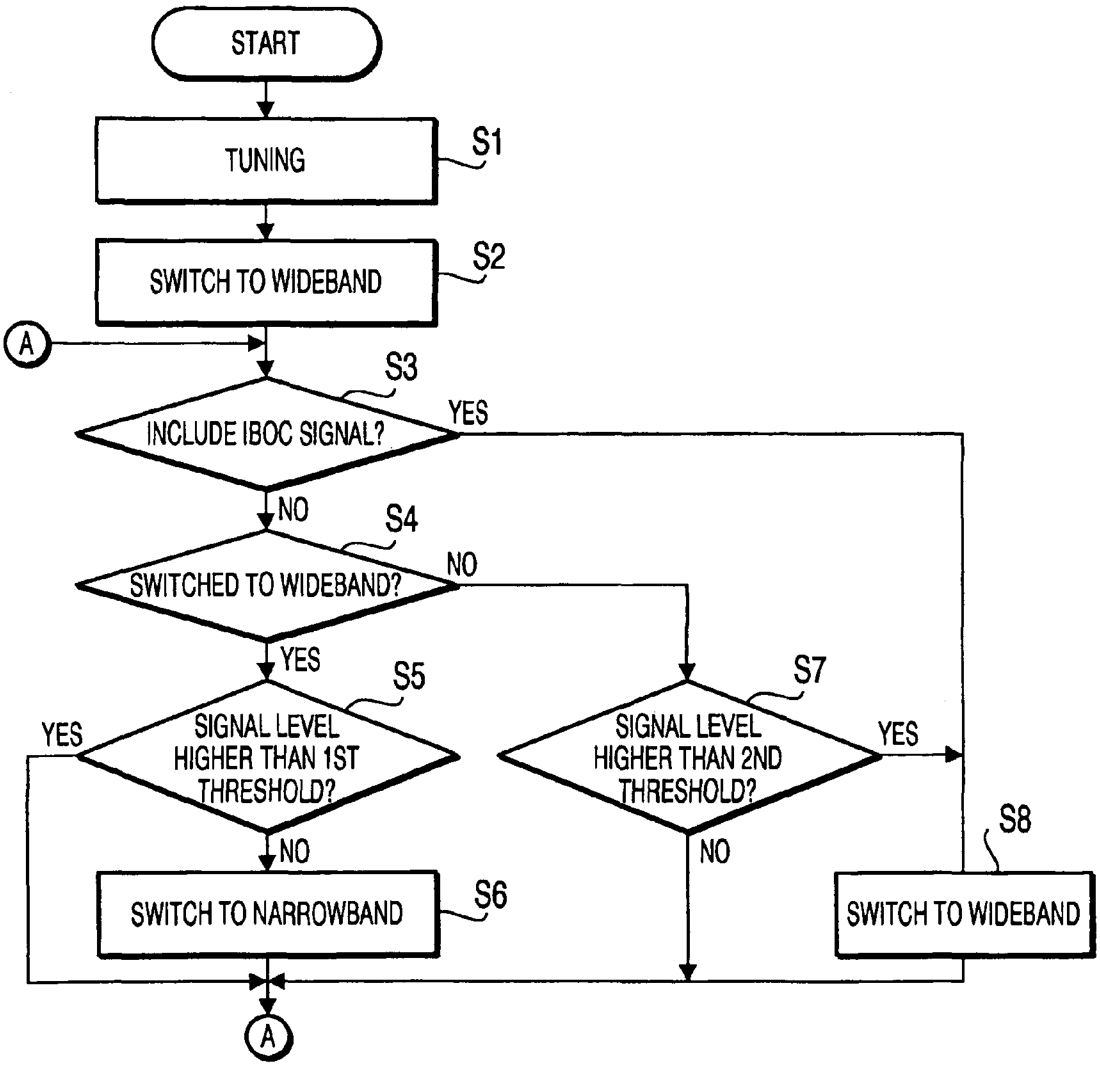

[FIG. 2] A flowchart describing radio broadcasting playing process carried out in the audio apparatus according to the embodiment of the invention.

DETAILED DESCRIPTION OF PREFERRED EMBODIMENTS

In the following, an IBOC broadcasting receiver according an embodiment of the invention will be described referring to the drawings.

FIG. 1 is a block diagram illustrating an arrangement of an audio apparatus 100 including an IBOC broadcast receiver according to an embodiment of the present invention. The audio apparatus 100 is equipped in, for example, a mobile vehicle. The audio apparatus 100 complies with IBOC radio broadcast, and is designed to receive and process IBOC analog/digital radio broadcast signal.

The audio apparatus 100 includes an antenna 1, a tuner 2, an IF (Intermediate Frequency) wideband filter 3, an IF narrowband filter 4, a filter switching switch 5, an IF amplifier 6, a separator SEP, an IF filter 7, an A/D converter 8, an analog signal processing circuit 9, an audio processing circuit 10, a D/A converter 11, a power amplifier 12, a speaker 13, a PLL (Phase Locked Loop) circuit 14, a microcomputer 15, an IDM (IBOC Digital Module) 16, an optical receiver 17, a remote controller 18, and a display 19.

The remote controller 18 is provided with operation keys for operating the audio apparatus 100. When the user operates the remote controller 18, a control pulse associated with the operation is output from the remote controller 18. Such control pulse output is, for example, a signal that complies with the IrDA standard. After the optical receiver 17 receives the control pulse that the remote controller 18 outputted, then passes it to the microcomputer 15.

The microcomputer 15 governs the general control of the overall audio apparatus 100. It executes those control programs based on the control pulse received from the optical receiver 17, and controls each element within the audio apparatus 100.

In the following, a series of signal processing in the audio apparatus 100 will be described.

The antenna 1 receives RF (Radio Frequency) signal for each channel of the radio broadcast. Each RF signal received on the antenna 1 is input to the tuner 2.

The tuner 2 performs the frequency conversion into an intermediate frequency suitable for signal processing of filtering, etc., by selecting the RF signal of the selected channel among input RF signals with the control carried out by the microcomputer 15 with the PLL circuit 14. The IF signal acquired by frequency conversion of the RF signal is input to both filters, namely, the IF wideband filter 3 and the IF narrowband filter 4. The selected channel is determined according to, for example, the station selecting operation by the user. The information regarding the last selected channel (Hereinafter, "last channel".) is, for example, held in the internal memory M or a flash ROM (not shown) of the microcomputer 15.

The IF wideband filter 3 and the IF narrowband filter 4 filter the IF signal and outputs to the filter switching switch 5. At the IF narrowband filter 4, the IF signal is filtered to pass the band where analog carrier wave resides (Hereinafter, "narrowband".), and is output to the filter switching switch 5. At the IF wideband filter 3, the IF signal is filtered to pass the band that analog carrier wave and its sideband are allocated (Hereinafter, the band consisting of analog carrier wave and the sideband is called "wideband".), and is output to the filter switching switch 5. For the purpose of description, the IF signal filtered at the IF wideband filter 3 and the IF narrowband filter 4 is called, "wideband IF signal" and "narrowband IF signal", respectively.

The filter switching switch 5 outputs to the IF amplifier 6, IF signal that was filtered at either one of the IF wideband filter 3 or the IF narrowband filter 4. Then, the IF amplifier 6 amplifies the IF signal from the filter switching switch 5 and outputs to the separator SEP. The separator SEP separates the input IF signal to two signal components based on, for example, its frequency band. One is the signal component acquired by converting analog carrier wave into the IF signal (Hereinafter, "analog IF signal".), and the other is the signal component acquired by converting the sideband into the IF signal (Hereinafter, "digital IF signal".). The separator SEP outputs each of the analog IF signal and the digital IF signal that was acquired by the separation to the IF filter 7 and the A/D converter 8, respectively.

In case the filter switching switch 5 is controlled for switching in order to output the narrowband IF signal, since the sideband is cut off, the IF signal input to the IF amplifier 6 does not include digital IF signal. In this case, the IF signal inputted to the separator SEP includes substantially only analog IF signal. Therefore, even if the separation process is done at the separator SEP, the digital IF signal will not be acquired, and there will be no input from the separator SEP to the A/D converter 8.

As an example for adjacent disturbance, there are cases when a part of the sideband for the selecting channel interferes with the sideband of the broadcasting station of adjacent broadcasting area, and as a result of the interference, the wideband IF signal becomes deteriorated. Influences of such adjacent disturbance become stronger, for example, when the receiving condition of the selecting channel is not good and the radio wave of the adjacent broadcasting is strong. Consequently, there are cases when the IF signal level becomes too big due to strong adjacent disturbance and the output of the IF amplifier 6 becomes clipped (distorted). Thus, it is desirable to adopt arrangements that decrease noise generated due to the adjacent disturbance, before the amplification by the IF amplifier 6.

In the audio apparatus 100 according to the embodiment of the invention, in order to suppress the clipping at the IF amplifier 6, as mentioned above, an arrangement that is provided with a filter switching switch 5 at the front stage of the IF amplifier 6 is adopted. Specifically, it is arranged such that the switching of the bandwidth for the IF signal is performed in advance at the front stage of the IF amplifier 6, and the filtered IF signal undergoes a well-known AGC (Automatic Gain Control) to be input to the IF amplifier 6. Since the narrowband IF signal is signal that does not include the sideband and relatively does not suffer from the influence of the adjacent disturbance, it is expected that the clipping of the output of the IF amplifier 6 advantageously becomes suppressed.

The IF filter 7 performs filtering process to the input analog IF signal to remove unneeded frequency components, and outputs to the A/D converter 8. The A/D converter 8 includes AID conversion processing circuits individually for the analog IF signal and for the digital IF signal. Then, it performs an analog-to-digital conversion to the analog or digital IF signal via their respective A/D conversion processing circuit. The A/D converter 8 outputs the A/D converted analog IF signal and digital IF signal to the analog signal processing circuit 9 and the IDM 16, respectively. The gain of the IF amplifier 6 is adjusted via feedback control based on the level of the IF signal input to the A/D converter 8.

The analog signal processing circuit 9 includes a detection circuit for detecting the analog IF signal, a noise canceller, and a weak electric field processing circuit. The analog IF signal input to the analog signal processing circuit 9 is decoded to the audio signal by the detection circuit. Then, the noise canceller removes the noise. After the removal of the noise, the weak electric field processing circuit performs processes that correspond to the receiving status of the selected channel (e.g., mute, high cut, and separation control). Then, after these series of processes, it is output to the audio processing circuit 10. For the purpose of description, the audio signal that underwent the processing of the analog signal processing circuit 9 and was output is described as, "analog audio signal".

The IDM 16 is a decoder for digital broadcasting signal for use only for IBOC. The IDM 16 performs a well-known decoding process to the input digital IF signal and acquires audio signal. Then, the acquired audio signal is output to the audio processing circuit 10. For the purpose of description, the audio signal that underwent the IDM 16 process and was output is described as, "digital audio signal".

Subsequently, the audio processing circuit 10 performs a predetermined process to the input audio signal and outputs to the volume circuit (not described). Such audio signal is volume-controlled at the volume circuit, and then input to the D/A converter 11. It is noted that if both the analog audio signal and the digital audio signal are input, the audio processing circuit 10 outputs either one of them. In addition, the digital audio signal is output given priority at the initial setting. For example, when the input signal is changed from only analog audio signal to both analog and digital audio signal, the audio processing circuit 10 operates to output the digital audio signal.

The D/A converter 11 performs a digital-to-analog conversion to the input audio signal and outputs to the power amplifier 12. The power amplifier 12 amplifies the audio signal and outputs to the speaker 13. Thereby, the radio broadcast is output and played at the speaker 13. It is noted that the audio processing circuit 10 is implemented with a blend circuit that smoothly switches between the input analog audio signal and digital audio signal and outputs either one of them. With the blend circuit, when the output signal is switched from analog audio signal to digital audio signal (or alternatively, from digital audio signal to analog audio signal), the sound output from the speaker 13 is coupled naturally so that the user does not sense the switch occurred.

In the following, radio broadcasting playing process in the audio apparatus 100 according to the present embodiment of the invention will be described. FIG. 2 shows a flowchart of the radio broadcasting playing process.

The radio broadcasting playing process in FIG. 2, for example, starts at the point in time when the power of the audio apparatus 100 is turned on and ends at the point in time when the power is turned off. That is, the radio broadcasting playing process is continued to be performed during the period when the power is on. Further, for example, when selection of a station was performed by user operation while the radio broadcasting playing process is performed, the process will be forced to return to the process in step 1, (Hereinafter, "step" is abbreviated as "S" in this application).

Upon the radio broadcasting playing process starts, the microcomputer 15 controls the tuner 2 via the PLL circuit 14 (S1) so that it performs on the tuning of the channel selected, for example, the last channel saved in the internal memory or by user operation.

Following the S1 process, the microcomputer 15 performs the switching control of the filter switching switch 5 so that the IF wideband filter 3 and the IF amplifier 6 are connected (S2). In other words, the wideband IF signal is input to the IF amplifier 6. This is because, when the selecting channel is not known to the audio apparatus 100 (e.g., for a channel selected for the first time), whether the channel is performing digital radio broadcasting or not is not known. Therefore, by setting the filtering to the wideband side in advance, it is able to detect IBOC signal that may be included in the unknown channel.

Following the S2 process, the microcomputer 15 determines whether IBOC signal is included in the selecting channel or not, referring to the output of IDM 16 (S3). Then, when it determined that IBOC signal is included in the selecting channel (S3: Yes), since the selecting channel is performing digital radio broadcasting, it continues on the current situation (i.e., continues on the situation where the filter switching switch 5 is switched to the IF wideband filter 3) and performs the S3 process periodically. By performing this process, the speaker 13 outputs and plays the digital radio broadcasting with clear sound quality.

If the microcomputer 15 determined that IBOC signal was not included referring to the output of the IDM 16 in the S3 process (S3: NO), it determines that the situation is either: the selecting channel includes only analog radio broadcasting, IBOC signal could not be detected due to receiving condition of the selecting channel, or the sideband is cut off at the filtering process. Then, it determines whether the IF signal is filtered to pass wideband (i.e., whether the filter switching switch 5 is switched to the IF wideband filter 3) (S4).

If the microcomputer 15 determined that IF signal was filtered to pass wideband in the S4 process (S4: YES), it further determines whether the signal level input to the audio processing circuit 10 exceeds a first threshold value or not (S5). It is noted that, if it was determined "YES" in the S4 process, it means either: the selecting channel includes only analog radio broadcasting, or IBOC signal could not be detected due to the receiving condition of the selecting channel.

If it is determined that the signal level is less than or equal to the first threshold value in the S5 process (S5: NO), it is in a situation where the receiving condition of the selecting channel is not good and the selecting channel is easily influenced by the adjacent disturbance. Therefore, the microcomputer 15 switches the filter switching switch 5 to the IF narrowband filter 4 (S6). That is, the IF signal is filtered to pass narrowband to cut off the sideband, and the influence of the adjacent disturbance to the selecting channel is decreased. By performing this process, analog radio broadcasting is output and output through the speaker 13 with the influence of the adjacent disturbance decreased (i.e., with clear sound quality). After performing the S6 process, the microcomputer 15 returns to the S3 process after waiting for a certain period.

If it is determined that the signal level is higher than the first threshold value in the S5 process (S5: YES), it is in a situation where the receiving condition of the selecting channel is relatively good and the selecting channel is not easily influenced by the adjacent disturbance. Therefore, the microcomputer 15 continues the state switched to the IF wideband filter 3 (i.e., the state capable of detecting IBOC signal) and returns to the S3 process after waiting for a certain period.

By continuing the state switched to the IF wideband filter 3, for example, if IBOC signal is not detected due to the receiving condition of the selecting channel, IBOC signal will be detected when the receiving condition becomes better. If the IBOC signal is detected and acquired, the above described series of processes (the generation of the digital IF signal, the digital audio signal, etc., and the processes at the audio processing circuit 10, the D/A converter 11, power amplifier 12, etc.) is performed, and the digital radio broadcasting with clear sound quality is played at the speaker 13.

For example, if the selecting channel includes only analog radio broadcasting, since it is not easily affected by the adjacent disturbance, the analog radio broadcasting is output and played at the speaker 13 in a clear sound quality.

According to the above described processes, it is able to provide to the user radio broadcasting with clear sound quality. When the receiving condition is improved, switching from analog radio broadcasting to digital radio broadcasting is done automatically, and it is enabled to provide to the user radio broadcasting with better sound quality.

If the microcomputer 15 determined that the filter switching switch 5 is switched to the IF narrowband filter 4 (S4: NO), it determines whether the signal level input to the audio processing circuit 10 is higher than a second threshold value or not, in order to determine whether to continue the switching state or not (S7). It is noted that, in the present embodiment, it is preferable to set the second threshold value higher (or different) than the first threshold value. This is because, for example, if the first and second threshold value is equal, the filter switching switch 5 may be switched frequently when the electric field (the level of the IF signal) is fluctuating small up and down in proximity to the threshold value. In the present embodiment, different values are set for the first and second threshold value in order to avoid such "chattering".

If it is determined that the signal level is less than or equal to the second threshold value in the S7 process (S7: NO), it is in a situation where the receiving condition of the selecting channel is not good and the selecting channel is easily influenced by the adjacent disturbance. Therefore, the microcomputer 15 continues the state not easily influenced by the adjacent disturbance without switching the filter switching switch 5 from the IF narrowband filter 4, and returns to the S3 process after waiting for a certain period. By performing this process, analog radio broadcasting is continued to be output and played with the influence of the adjacent disturbance decreased.

If it is determined that the signal level is higher than the second threshold value in the S7 process (S7: YES), it is in a situation where the receiving condition of the selecting channel is relatively good and the selecting channel is not easily influenced by the adjacent disturbance. Therefore, the microcomputer 15 switches the filter switching switch 5 to the IF wideband filter 3 in order to switch the filtering for the IF signal from narrowband to wideband, and returns to the S3 process after waiting for a certain period.

After switched to the IF wideband filter 3, the microcomputer 15 becomes a state where IBOC signal for the selecting channel can be detected and acquired. When the receiving condition further improved and IBOC signal is detected and acquired from the wideband IF signal for the selecting channel, the radio broadcast to be output and played is automatically switched from analog radio broadcasting to digital radio broadcasting. Even in a case where the IBOC signal is not detected and acquired from the wideband IF signal, analog radio broadcasting with small influence of the adjacent disturbance is continued to be output and played. According to this process, it is able to provide to the user radio broadcasting with better sound quality. Further, when the receiving state is improved, the digital broadcasting is switched to the analog broadcasting. As a result, it becomes possible to provided radio broadcasting having more excellent sound quality.

In other words, according to the IBOC broadcasting receiver of the present embodiment, since the influence of adjacent disturbance is small when the receiving condition is good, it is arranged such that the filtering is set to wideband regardless of the existence of the IBOC signal. Thereby, analog radio broadcasting is output and played in a state where adjacent disturbance is decreased or small, and also, the radio broadcasting to be output and played is automatically switched from analog radio broadcasting to digital radio broadcasting, for example, when the IBOC signal was detected and acquired after the receiving condition was improved.

Embodiments of the invention are described in the above. However, the present invention is not to be limited to those embodiments and various modifications are possible. For example, the audio apparatus 100 including the IBOC broadcasting receiver according to the embodiments is equipped in a vehicle but it may be a mobile instrument for a person to carry.

What is claimed is:

1. A broadcasting receiver suitable for receiving a broadcasting signal transmitted in an IBOC signal format, comprising:
- a narrowband filtering unit that processes an analog broadcasting signal included in the broadcasting signal;
- a wideband filtering unit that processes a digital broadcasting signal included in the broadcasting signal;
- a demodulating unit that demodulates the broadcasting signal;
- a signal level detecting unit that detects a level of the broadcasting signal;
- a digital determining unit that determines whether the broadcasting signal includes the digital broadcasting signal or not; and
- a filter switching unit that switches a filtering unit for use in processing the broadcasting signal to be input to the demodulating unit between the narrowband filtering unit and the wideband filtering unit, according to the level of the detected broadcasting signal, when the digital determining unit determines that the broadcasting signal does not include the digital broadcasting signal;
- wherein the filter switching unit operates such that the broadcasting signal processed by the wideband filtering unit is input to the demodulating unit when the level of the detected broadcasting signal is higher than a certain value, and operates such that the broadcasting signal processed by the narrowband filtering unit is input to the demodulating unit when the level of the detected broadcasting signal is lower than or equal to the certain value.

2. The broadcasting receiver according to claim 1, wherein: the filter switching unit includes a switching switch, and the switching switch receives as input the broadcasting signal processed by the narrowband filtering unit and the broadcasting signal processed by the wideband filtering unit, and outputs only one of the input broadcasting signals.

3. The broadcasting receiver according to claims 1, further comprising an amplifying unit that amplifies the broadcasting signal, wherein the broadcasting signal processed by the filtering unit is input to the demodulating unit via the amplifying unit.

4. The broadcasting receiver according to claim 1, wherein the certain value is set to a minimum value of an acceptable level of the broadcasting signal against the influence of adjacent disturbance is allowable.

5. The broadcasting receiver according to claim 1, further comprising: a selecting unit that selects a channel; and an IBOC determining unit that determines whether the broadcasting signal is in the IBOC signal format or not by monitoring the broadcasting signal output to the demodulating unit; and wherein, immediately after a channel is selected by the selecting unit, the filter switching unit operates such that the broadcasting signal processed by the wideband filtering unit is input to the demodulating unit.

6. The broadcasting receiver according to claim 1, wherein the broadcasting receiver is capable of being mounted on a mobile unit.

7. An method for receiving a broadcasting signal transmitted in an IBOC signal format, comprising:
- a filtering step of filtering the broadcasting signal using one of a narrowband filtering unit that processes an analog broadcasting signal included in the broadcasting signal and a wideband filtering unit that processes a digital broadcasting signal included in the broadcasting signal;
- a demodulating step of demodulating the broadcasting signal;
- a signal level detecting step of detecting a level of the broadcasting signal;
- a digital determining step of determining whether the broadcasting signal includes the digital broadcasting signal or not; and
- a filter switching step of switching filtering unit for use in the filtering step between the narrowband filtering unit and the wideband filtering unit, according to the level of the detected broadcasting signal, when it is determined that the broadcasting signal does not include the digital broadcasting signal;

wherein, in the filter switching step, the filtering unit for use in the filtering step is switched to the wideband filtering unit when the level of the detected broadcasting signal is higher than a certain level, and to the narrowband filtering unit when the level of the detected broadcasting signal is lower than or equal to the certain level.

8. The method according to claim 7, wherein in the filter switching step, the filtering unit for use in the filtering step is switched by selecting one of the broadcasting signal processed by the narrowband filtering unit and the broadcasting signal processed by the wideband filtering unit.

9. The method according to an claim 7, further comprising an amplifying step of amplifying the broadcasting signal, wherein in the filtering step, the amplifying step and the demodulating step are performed in this order.

10. The method according to claim 7, wherein the certain value is set to a minimum value of an allowable level of the broadcasting signal against the influence of adjacent disturbance is allowable.

11. The method according to claim 7, further comprising: a selecting step of selecting a channel; and an IBOC determining step of determining whether the broadcasting signal is in the IBOC signal format or not by monitoring the broadcasting signal demodulated in the demodulating step, wherein immediately after a channel is selected by the selecting step, in the filter switching step, the filtering unit for use in the filtering step is switched to the wideband filtering unit.

* * * * *